US012592203B2

(12) United States Patent
Chen et al.

(10) Patent No.: US 12,592,203 B2
(45) Date of Patent: Mar. 31, 2026

(54) DISPLAY DEVICE, BACKLIGHT CONTROL CIRCUIT AND BACKLIGHT CONTROL METHOD

(71) Applicant: Radiant Opto-Electronics Corporation, Kaohsiung City (TW)

(72) Inventors: Pei-Ting Chen, Kaohsiung City (TW); Peng-Hsiang Wu, Kaohsiung City (TW); Jon-Hong Lin, Kaohsiung City (TW)

(73) Assignee: Radiant Opto-Electronics Corporation, Kaohsiung City (TW)

( * ) Notice: Subject to any disclaimer, the term of this patent is extended or adjusted under 35 U.S.C. 154(b) by 0 days.

(21) Appl. No.: 19/097,883

(22) Filed: Apr. 2, 2025

(65) Prior Publication Data

US 2025/0232736 A1 Jul. 17, 2025

Related U.S. Application Data

(63) Continuation of application No. PCT/CN2023/140564, filed on Dec. 21, 2023.

(30) Foreign Application Priority Data

Oct. 31, 2023 (CN) ......................... 202311427639.3

(51) Int. Cl.
*G09G 3/34* (2006.01)

(52) U.S. Cl.
CPC ..... *G09G 3/3406* (2013.01); *G09G 2330/023* (2013.01)

(58) Field of Classification Search
CPC .... G09G 3/3406; G09G 3/342; G09G 3/3426; G09G 3/3413; G02F 1/133603
See application file for complete search history.

(56) References Cited

U.S. PATENT DOCUMENTS

2011/0157255 A1 6/2011 Hsu et al.
2020/0257167 A1 * 8/2020 Miyata ................ G09G 3/3413
2021/0233478 A1 7/2021 Sun et al.

FOREIGN PATENT DOCUMENTS

CN 101438629 A 5/2009
CN 102376273 A 3/2012
CN 102411903 A 4/2012
CN 102984861 A 3/2013

(Continued)

*Primary Examiner* — Koosha Sharifi-Tafreshi
(74) *Attorney, Agent, or Firm* — CKC & Partners Co., LLC

(57) ABSTRACT

A backlight control circuit includes a power supply circuit, a local dimming circuit, a backlight driving circuit, and a supply voltage adjustment circuit. The power supply circuit is used to output the power supply voltage to a backlight module. The backlight module has multiple dimming zones, and each dimming zone has light emitting diodes (LEDs). The local dimming circuit is used to generate a local dimming signal according to image data and a configuration of the dimming zones. The backlight driving circuit is used to generate backlight driving signals to the dimming zones of the backlight module according to the local dimming signal. The supply voltage adjustment circuit is used to generate a first supply voltage adjustment signal to the power supply circuit for adjusting the power supply voltage based on the local dimming signal and a characteristic data of each LED in the dimming zones.

17 Claims, 6 Drawing Sheets

(56) References Cited

FOREIGN PATENT DOCUMENTS

| | | | |
|---|---|---|---|
| CN | 105761682 | A | 7/2016 |
| CN | 206864163 | U | 1/2018 |
| KR | 10-2008-0023811 | A | 3/2008 |
| KR | 10-2011-0022929 | A | 3/2011 |
| TW | 201123162 | A | 7/2011 |
| TW | M446396 | U | 2/2013 |

* cited by examiner

DISPLAY DEVICE, BACKLIGHT CONTROL CIRCUIT AND BACKLIGHT CONTROL METHOD

RELATED APPLICATIONS

This application is a continuation application of International Application No. PCT/CN2023/140564 filed on Dec. 21, 2023, which claims priority to China Application Serial Number 202311427639.3, filed Oct. 31, 2023. The entire contents of each of which are incorporated by reference.

BACKGROUND

Technical Field

The present disclosure relates to a display device, a backlight control circuit, and a backlight control method, and more particularly to a display device, a backlight control circuit, and a backlight control method with a feed-forward adjustment mechanism for adjusting an operating voltage of a backlight module.

Description of Prior Art

A backlight system in a conventional display device is used to provide a backlight source for a display panel displaying a frame image. For a display device with a local dimming function, the backlight system includes a backlight module, a power supply circuit, a backlight driving circuit, and a local dimming circuit. When the display panel displays a frame image, the power supply circuit provides a required operating voltage to the backlight module, and the backlight driving circuit adjusts the supplied backlight driving signals based on the local dimming signal of the local dimming circuit to change the current values flowing through the backlight module, thereby adjusting the brightness of the backlight module. Some backlight systems also include a feedback mechanism that monitors the actual brightness of the backlight module and adjusts the operating voltage and the driving currents accordingly to ensure that the brightness of the backlight module always matches the desired value for providing a more stable display.

However, the adjustment of the operating voltage and the driving current depends on the response rate of the feedback circuit and the backlight driving circuit. A slow response rate of the backlight driving circuit will result in a slower supply of the driving currents to the backlight module, which affects the control time point of the feedback circuit and results in a longer stabilization time for the driving current and a higher power loss. Moreover, when the screen changes rapidly, dynamic adjustment of the operating voltage using the feedback mechanism may result in a situation where the operating voltage does not follow immediately.

SUMMARY

The present disclosure provides a backlight control circuit including a power supply circuit, a local dimming circuit, a backlight driving circuit, and a supply voltage adjustment circuit. The power supply circuit is used to output a power supply voltage to the backlight module. The backlight module has a plurality of dimming zones, and each dimming zone includes a plurality of light emitting diodes (LEDs). The local dimming circuit is used to generate a local dimming signal based on an image data and a configuration of the dimming zones. The backlight driving circuit is used to generate a plurality of backlight driving signals based on the local dimming signal. The supply voltage adjustment circuit is used to generate a first supply voltage adjustment signal to the power supply circuit for adjusting the power supply voltage based on the local dimming signal and a characteristic data of each LED in the dimming zones.

According to one embodiment of the present disclosure, the local dimming signal includes a plurality of luminance values corresponding to the dimming zones in the image data, and the luminance values are provided to the backlight driving circuit to generate the backlight driving signals accordingly.

According to one embodiment of the present disclosure, each of the backlight driving signals is a current driving signal, and the characteristic data includes a relationship data between an operating voltage and an operating current of each LED in the dimming zones.

According to one embodiment of the present disclosure, the supply voltage adjustment circuit is further configured to generate a second supply voltage adjustment signal to the power supply circuit to adjust the power supply voltage in response to the power supply voltage being out of a voltage range corresponding to the image data, and wherein the second supply voltage adjustment signal is generated based on a detection signal of each LED in the dimming zones.

According to one embodiment of the present disclosure, the supply voltage adjustment circuit includes an analog regulation circuit. The analog regulation circuit is used to decrease a level of the power supply voltage in response to an increasing level of the second supply voltage adjustment signal, and to increases the level of the power supply voltage in response to a decreasing level of the second supply voltage adjustment signal.

According to one embodiment of the present disclosure, the detection signal is a cathode voltage of each LED.

According to one embodiment of the present disclosure, the detection signal is generated by the backlight driving circuit detecting a cathode voltage of each LED.

The present disclosure provides a display device including a display panel, a backlight module, a power supply circuit, a power supply circuit, a backlight driving circuit, a supply voltage adjustment circuit. The display panel is used to display a frame image based on an image data. The backlight module is used to provide a backlight source to the display panel. The backlight module has a plurality of dimming zones, and each dimming zone includes a plurality of light emitting diodes (LEDs). The power supply circuit is used to output a power supply voltage to the backlight module. The local dimming circuit is used to generate a local dimming signal based on an image data and a configuration of the dimming zones. The backlight driving circuit is used to generate a plurality of backlight driving signals to the dimming zones of the backlight module based on the local dimming signal. The supply voltage adjustment circuit is used to generate a supply voltage adjustment signal to the power supply circuit for adjusting the power supply voltage based on the local dimming signal and a characteristic data of each LED in the dimming zones.

According to one embodiment of the present disclosure, the power supply circuit is configured to adjust the power supply voltage according to the supply voltage adjustment signal before the display panel displays the frame image.

According to one embodiment of the present disclosure, each of the backlight driving signals is a current driving signal, and the characteristic data includes a relationship data between an operating voltage and an operating current of each LED in the dimming zones.

The present disclosure provides a backlight control method including providing a power supply voltage to a backlight module; generating a local dimming signal based on an image data and a configuration of a plurality of dimming zones in the backlight module, in which each dimming zone includes a plurality of light emitting diodes (LEDs); generating a plurality of backlight driving signals to the dimming zones of the backlight module based on the local dimming signal; generating a first supply voltage adjustment signal based on the local dimming signal and a characteristic data of each LED in the dimming zones; and adjusting the power supply voltage according to the first supply voltage adjustment signal.

According to one embodiment of the present disclosure, the power supply voltage is adjusted according to the first supply voltage adjustment signal is performed before a frame image based on the image data is displayed on a display panel provided with a backlight source by the backlight module.

According to one embodiment of the present disclosure, each of the backlight driving signals is a current driving signal, and the characteristic data comprises a relationship data between an operating voltage and an operating current of each LED in the dimming zones.

According to one embodiment of the present disclosure, the backlight control method further includes generating a second supply voltage adjustment signal based on a detection signal of each LED in the dimming zones in response to the power supply voltage being out of a voltage range corresponding to the image data; and adjusting the power supply voltage based on the second supply voltage adjustment signal.

According to one embodiment of the present disclosure, adjusting the power supply voltage based on the second supply voltage adjustment signal includes decreasing a level of the power supply voltage in response to a level of the second supply voltage adjustment signal increasing, and increasing the level of the power supply voltage in response to the level of the second supply voltage adjustment signal decreasing.

According to one embodiment of the present disclosure, the detection signal is a cathode voltage of each LED.

According to one embodiment of the present disclosure, the backlight control method further includes detecting a cathode voltage of each LED to generate the detection signal.

BRIEF DESCRIPTION OF THE DRAWINGS

In order that the foregoing and other objects, features, advantages and embodiments of the present disclosure may be more readily understood, the accompanying drawings are illustrated as follows.

DETAILED DESCRIPTION

Figure 1:
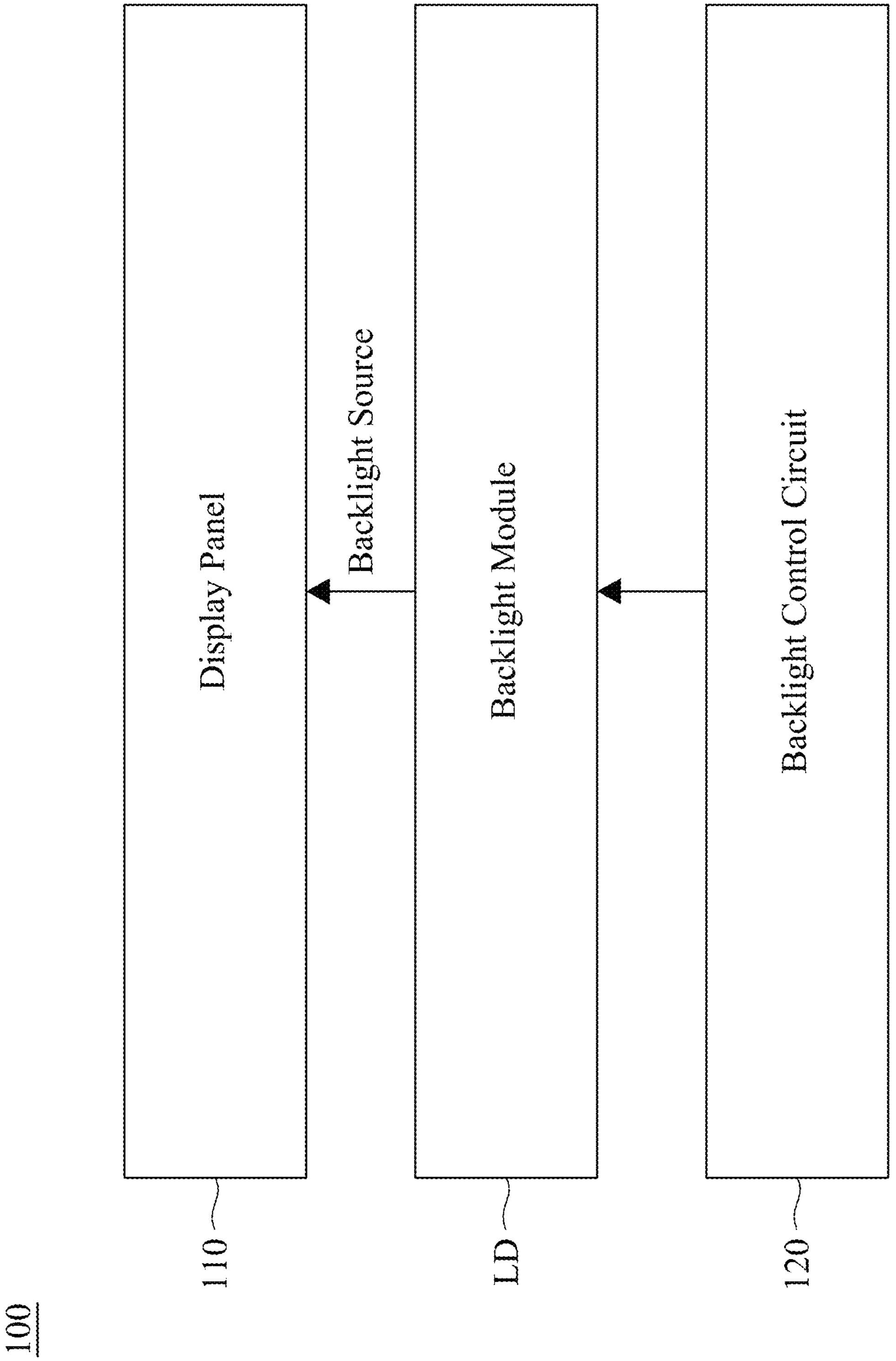
FIG. 1 is a schematic diagram of a display device according to an embodiment of the present disclosure.

Referring to FIG. 1, a display device 100 includes a display panel 110 and a backlight control circuit 120. The display panel 110 may be, for example, a twisted nematic (TN) display panel, a vertical alignment (VA) display panel, an in-plane switching (IPS) display panel, or another suitable type of display panel. The backlight control circuit 120 is used to control a backlight module LD to provide a backlight source required by the display panel 110 for image display, and the backlight module LD may be a direct type backlight module, which is disposed on a backside of the display panel 110. The backlight control circuit 120 may implement a local dimming of the backlight module LD based on the image data, such that different display zones on the display panel 110 may display different brightness based on the backlight source provided by the backlight module LD.

Figure 2:
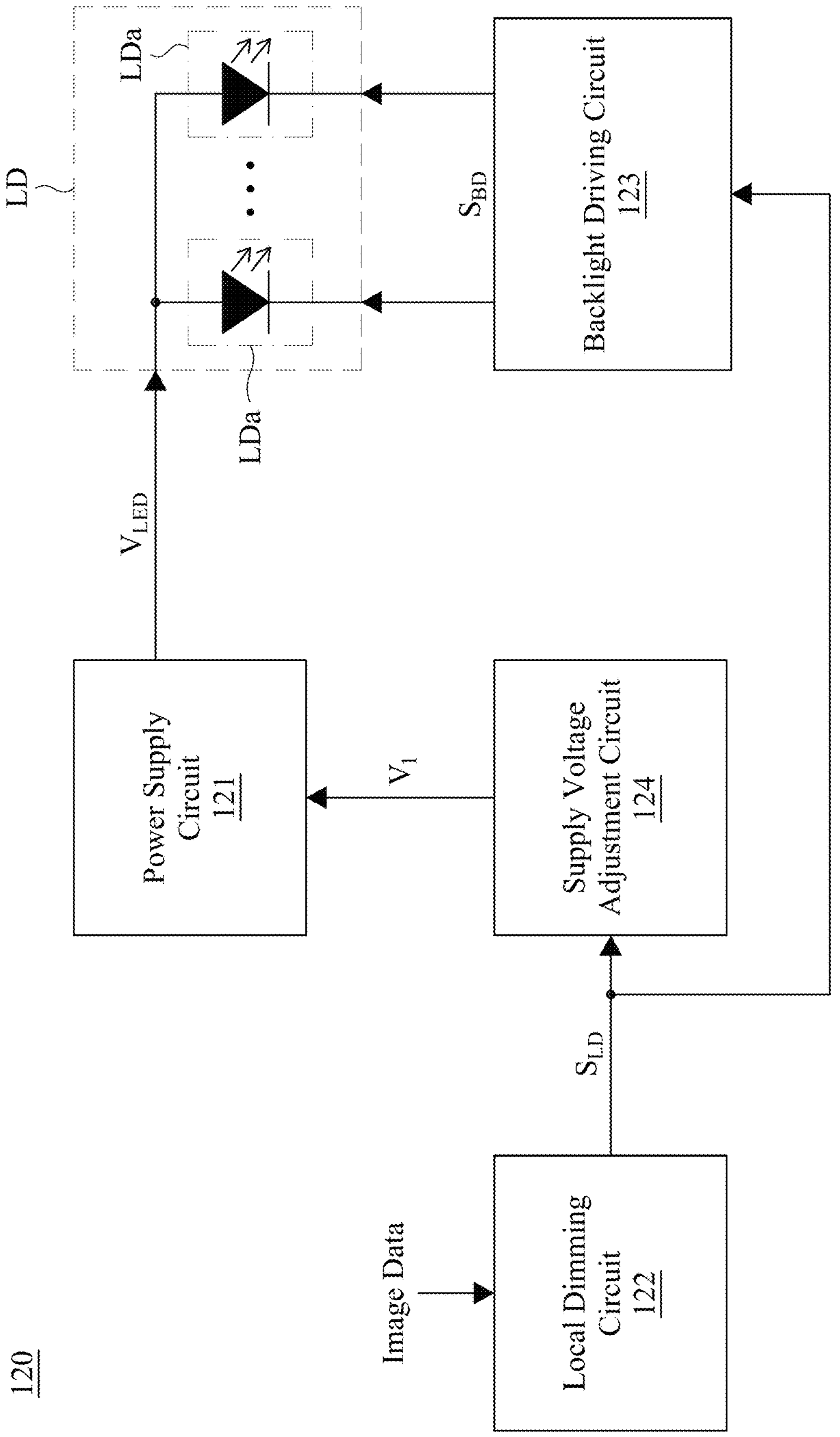
FIG. 2 is a schematic diagram of a backlight control circuit and a backlight module of a display device according to an embodiment of the present disclosure.

Referring to FIG. 2, the backlight module LD has a plurality of dimming zones LDa, and each dimming zone LDa may have a plurality of light emitting diodes (LEDs). The backlight control circuit 120 includes a power supply circuit 121, a local dimming circuit 122, a backlight driving circuit 123, and a supply voltage adjustment circuit 124. The power supply circuit 121 is electrically connected to the backlight module LD and is used to output the power supply voltage $V_{LED}$ to the backlight module LD to provide a total operating voltage Vx required for the LEDs in the dimming zones LDa. The local dimming circuit 122 is used to receive an image data and generate a local dimming signal $S_{LD}$ based on the image data and a configuration of the dimming zones LDa. The backlight driving circuit 123 is electrically connected to the backlight module LD and the local dimming circuit 122, and is used to receive the local dimming signal $S_{LD}$ and generate a corresponding backlight driving signal SBD to each of the dimming zones LDa of the backlight module LD. The supply voltage adjustment circuit 124 is electrically connected to the power supply circuit 121 and the local dimming circuit 122, and is used to generate a first supply voltage adjustment signal $V_1$ based on the local dimming signal $S_{LD}$ and the characteristic data of each LED in each of the dimming zones LDa to adjust the power supply voltage $V_{LED}$ of the backlight module LD required for the next frame image in advance. In this way, the backlight control circuit 120 may adjust the power supply voltage $V_{LED}$ to an appropriate value in advance according to the local dimming signal $S_{LD}$ and the characteristic data of each LED in the dimming zones LDa, and the adjusted supply voltage $V_{LED}$ is then transmitted to the backlight module LD. This method of transmitting the first supply voltage adjustment signal $V_1$ to the power supply circuit 121 to adjust the power supply voltage $V_{LED}$ in advance enables the power supply voltage $V_{LED}$ to be adjusted and controlled in real time in response to the rapid change of the screen, which not only accelerates the stabilization of a driving current required for each dimming zone LDa, but also improves the transient response and the power consumption of the light board (backlight module LD), and effectively reduces the power loss.

In some embodiments, as shown in FIG. 2, the LEDs in each dimming zone LDa are connected in series, so that the currents flowing through the LEDs are the same, and the luminances of the LEDs are approximately the same. If one of the dimming zones LDa has N LEDs connected in series and the operating voltage required for each LED is $V_F$, then the total operating voltage Vx required for the dimming zone LDa must be at least $N \times V_F$. Therefore, the power supply voltage $V_{LED}$ supplied by the power supply circuit 121 to the dimming zone LDa needs to be greater than the total operating voltage Vx to illuminate the dimming zone LDa. Conversely, if the power supply voltage $V_{LED}$ supplied by the power supply circuit 121 to the dimming zone LDa is less than the total operating voltage Vx, the dimming zone LDa cannot be illuminated.

The power supply circuit 121 may be a linear power supply or a switching power supply, and the power supply voltage $V_{LED}$ output from the power supply circuit 121 may be realized by analog or digital means for feedback control, and the present disclosure is not limited thereto.

The local dimming signal $S_{LD}$ includes the luminance values (or dim levels) corresponding to each of the dimming zones LDa in the image data, and these luminance values are provided to the backlight driving circuit 123 to generate the corresponding backlight driving signals SBD. The backlight driving signal SBD may be a current driving signal, which is used to control the current value flowing through each LED in each dimming zone LDa. The required current of each channel of the backlight driving circuit 123 (or LED driver IC) is then obtained according to the information of the backlight driving circuit 123 corresponding to each dimming zone LDa, ensuring that each dimming zone LDa produces the corresponding brightness.

The characteristic data includes a relationship data between the operating voltage $V_F$ and the operating current $I_F$ of each LED in each dimming zone LDa. The characteristic data may be pre-built into the supply voltage adjustment circuit 124 to calculate the basic power supply voltage $V_{LED}$ required to illuminate these dimming zones LDa as soon as the supply voltage adjustment circuit 124 receives the local dimming signal $S_{LD}$. Then, the supply voltage adjustment circuit 124 generates a first supply voltage adjustment signal $V_1$ to the power supply circuit 121 to adjust the power supply voltage $V_{LED}$ to an appropriate value in advance. In other words, the DC output voltage of the power supply circuit 121 is controlled. Ultimately, the power supply voltage $V_{LED}$ of the power supply circuit 121 is controlled within a reasonable range, which has the advantage of faster real time regulation.

Figure 3:
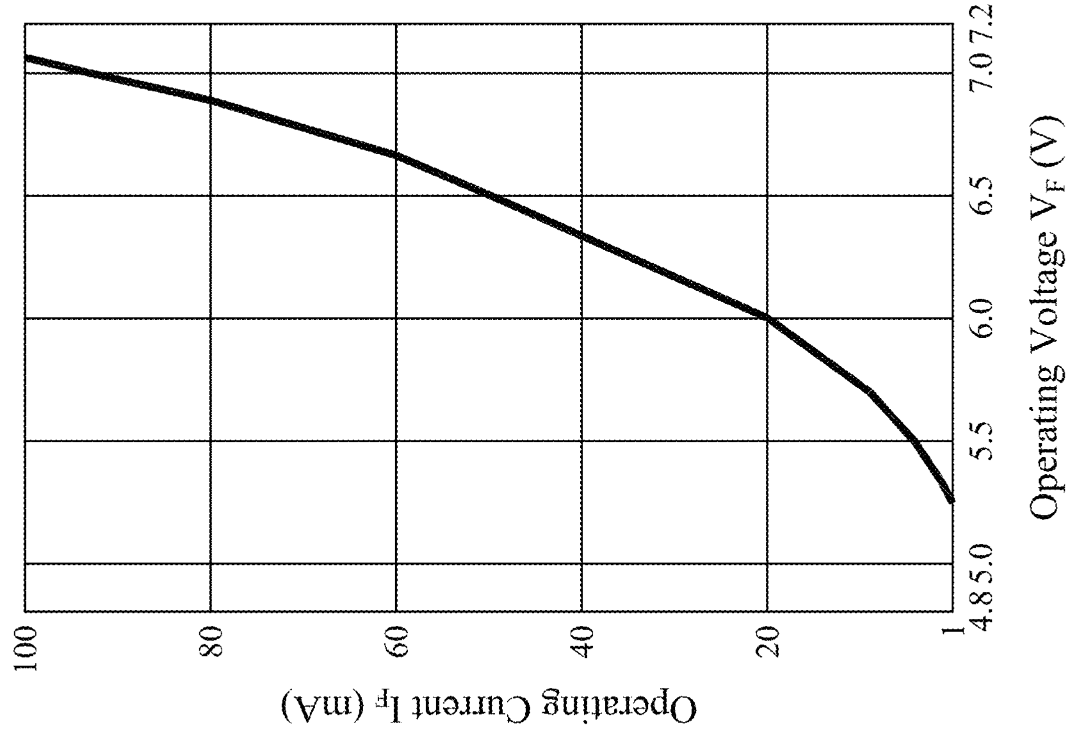
FIG. 3 is a schematic diagram of a characteristic data according to an embodiment of the present disclosure.

The desired luminance values of the dimming zones LDa are proportional to the operating current $I_F$. As shown in FIG. 3, the operating voltage $V_F$ has a one-to-one correspondence with the operating current $I_F$ in the range of 1 milliampere (mA) to 100 mA. Therefore, when the supply voltage adjustment circuit 124 obtains the required luminance values (which also represent the current values flowing through the LEDs) of each dimming zone LDa based on the local dimming signal $S_{LD}$, the supply voltage adjustment circuit 124 can obtain the required operating voltage $V_F$ of each LED based on the operating current $I_F$ in the characteristic data in advance, and then predetermine the required basic power supply voltage $V_{LED}$ of the dimming zones LDa in advance. As a result, the power supply voltage $V_{LED}$ can be adjusted to an appropriate value in advance according to the first supply voltage adjustment signal $V_1$, thus accelerating the speed of stabilizing the driving current required by each dimming zone LDa and effectively reducing the power loss.

Figure 4:
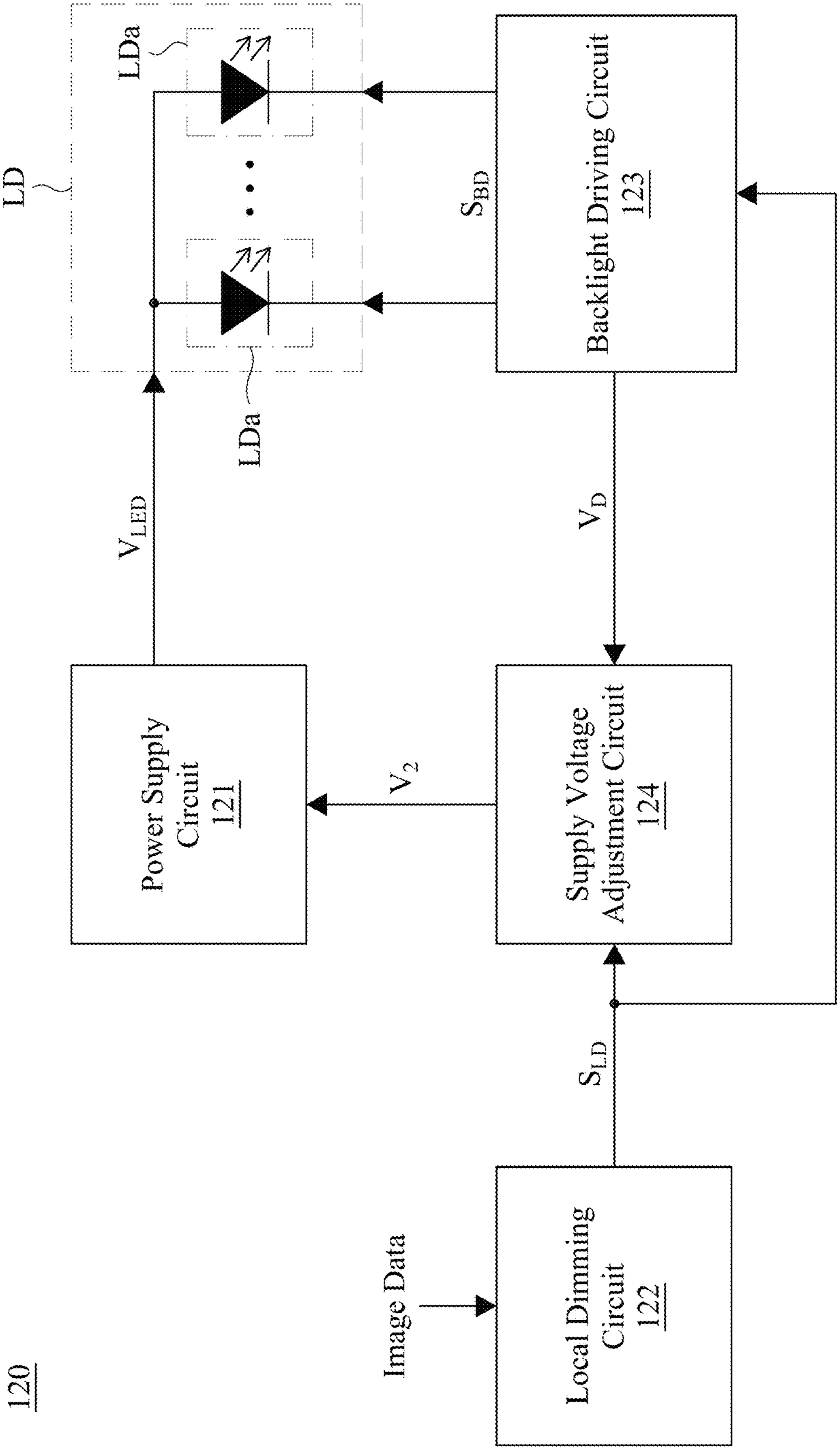
FIG. 4 is a schematic diagram of a backlight control circuit and a backlight module of a display device according to an embodiment of the present disclosure.

In this embodiment, the power supply circuit 121 further includes an analog regulation circuit. As shown in FIG. 4, when the power supply voltage $V_{LED}$ adjusted by the first supply voltage adjustment signal $V_1$ is out of a voltage range corresponding to the image data, the supply voltage adjustment circuit 124 further generates a second supply voltage adjustment signal $V_2$ to the analog regulation circuit of the power supply circuit 121 based on a detection signal $V_D$ of each LED in the dimming zones LDa to fine-tune the power supply voltage $V_{LED}$. The detection signal $V_D$ may be a cathode voltage of each LED, or an adjustment signal generated by the backlight driving circuit 123 after detecting a cathode voltage of each LED. This allows the power supply voltage $V_{LED}$ to be dynamically adjusted according to an actual voltage range, which is a method of adjusting the power supply voltage $V_{LED}$ after the fact, which not only improves the transient response, but also ensures that each dimming zone LDa of the backlight module LD may operate stably and safely, and improves the stability and reliability of the power supply voltage $V_{LED}$.

Specifically, the power supply circuit 121 decreases a level of the power supply voltage $V_{LED}$ when a level of the second supply voltage adjustment signal $V_2$ increases, and increases the level of the power supply voltage $V_{LED}$ when the level of the second supply voltage adjustment signal $V_2$ decreases. In this way, the second supply voltage adjustment signal $V_2$ serves as an adjustment voltage for a feedback mechanism to fine-tune the power supply voltage $V_{LED}$ to a desired value. This feedback mechanism ensures that an actual operating voltage of each dimming zone LDa of the backlight module LD is within a preset voltage or within the voltage range corresponding to the image data.

Figure 5:
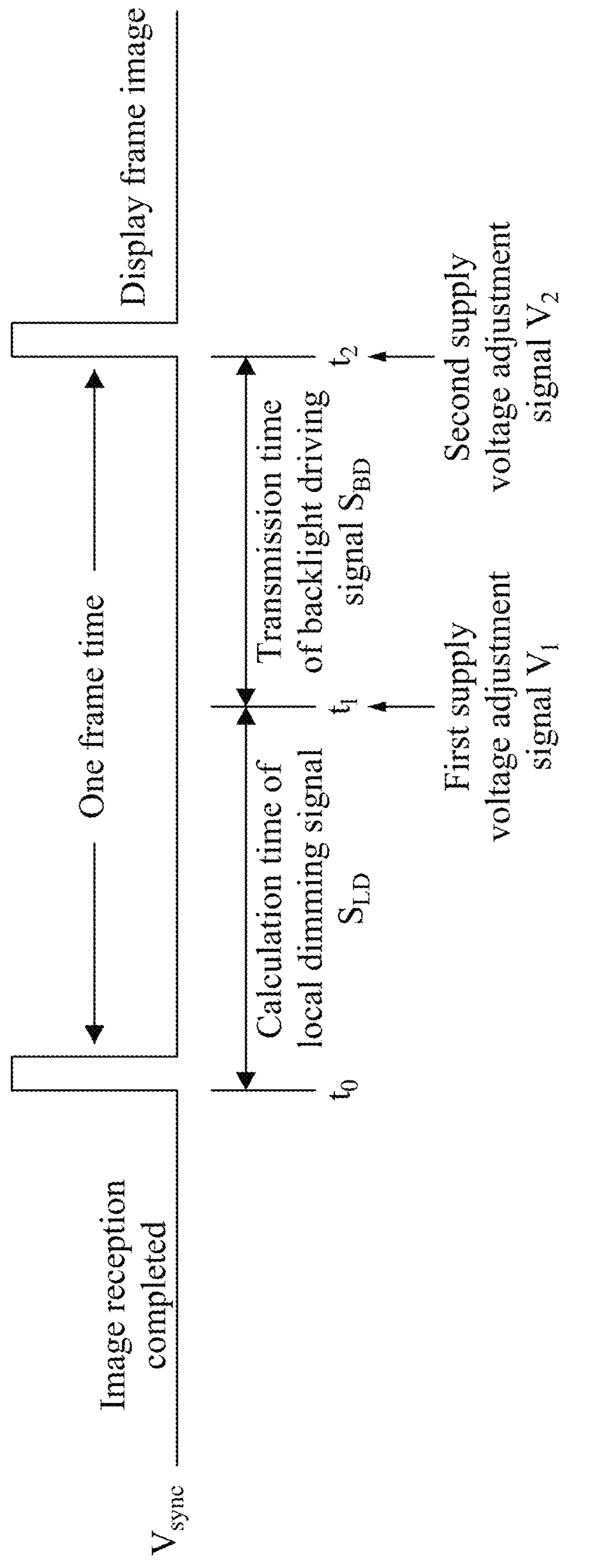
FIG. 5 is a schematic diagram of a control timing according to an embodiment of the present disclosure.

In this embodiment, the backlight control circuit 120 further includes a timing controller for instructing the backlight control circuit 120 to control the backlight module LD according to the timing. Referring to FIG. 5, the timing controller generates a vertical synchronization signal $V_{sync}$ to enable the local dimming circuit 122 and the backlight driving circuit 123 to complete the calculation of the local dimming signal $S_{LD}$ (during the period from a time point $t_0$ to a time point $t_1$) and the transmission of the backlight driving signal SBD (during the period from a time point $t_1$ to a time point $t_2$) within one frame period, and to enable the display panel 110 to display the frame image at the next pulse signal of the vertical synchronization signal $V_{sync}$. At the time point $t_1$, the local dimming signal $S_{LD}$ has been calculated, and based on the local dimming signal $S_{LD}$ and the characteristic data of each LED in each dimming zone LDa, the supply voltage adjustment circuit 124 may generate the first supply voltage adjustment signal $V_1$ at the time point $t_1$, and adjust the power supply voltage $V_{LED}$ to an appropriate value in advance. At the time point $t_2$, the supply voltage adjustment circuit 124 may generate the second supply voltage adjustment signal $V_2$ based on the detection signal $V_D$ of each LED in the dimming zone LDa to fine-tune the power supply voltage $V_{LED}$.

For example, during the time between the completion of image reception and the start of frame image display, the local dimming circuit 122 generates the corresponding backlight driving signals SBD according to the respective multiple luminance values (dim levels) in the image data. Therefore, the backlight driving circuit 123 may generate the corresponding backlight driving signals SBD in response to rapid screen changes. For example, at a frame rate of 60 Hz, the backlight driving circuit 123 may output the backlight driving signals SBD at a time of approximately 16.6 milliseconds (ms) from the completion of image reception to the start of screen display.

In some embodiments, the total operating voltage Vx required for each dimming zone LDa varies depending on the configuration of the LEDs, and thus the power supply circuit 121 may also supply the same (e.g., shared) or different power supply voltages $V_{LED}$ to each dimming zone LDa as desired. For example, the power supply circuit 121 may provide more power supply paths to the backlight modules LD, and these power supply paths may have different power supply voltages $V_{LED}$. In some embodiments, the LEDs in each dimming zone LDa are connected in series and parallel, such that the LEDs form a plurality of sets of LED strings connected in parallel, and each set of LED strings may flow through the same or a different current and emit a corresponding luminance according to the currents flowing through them.

Figure 6:
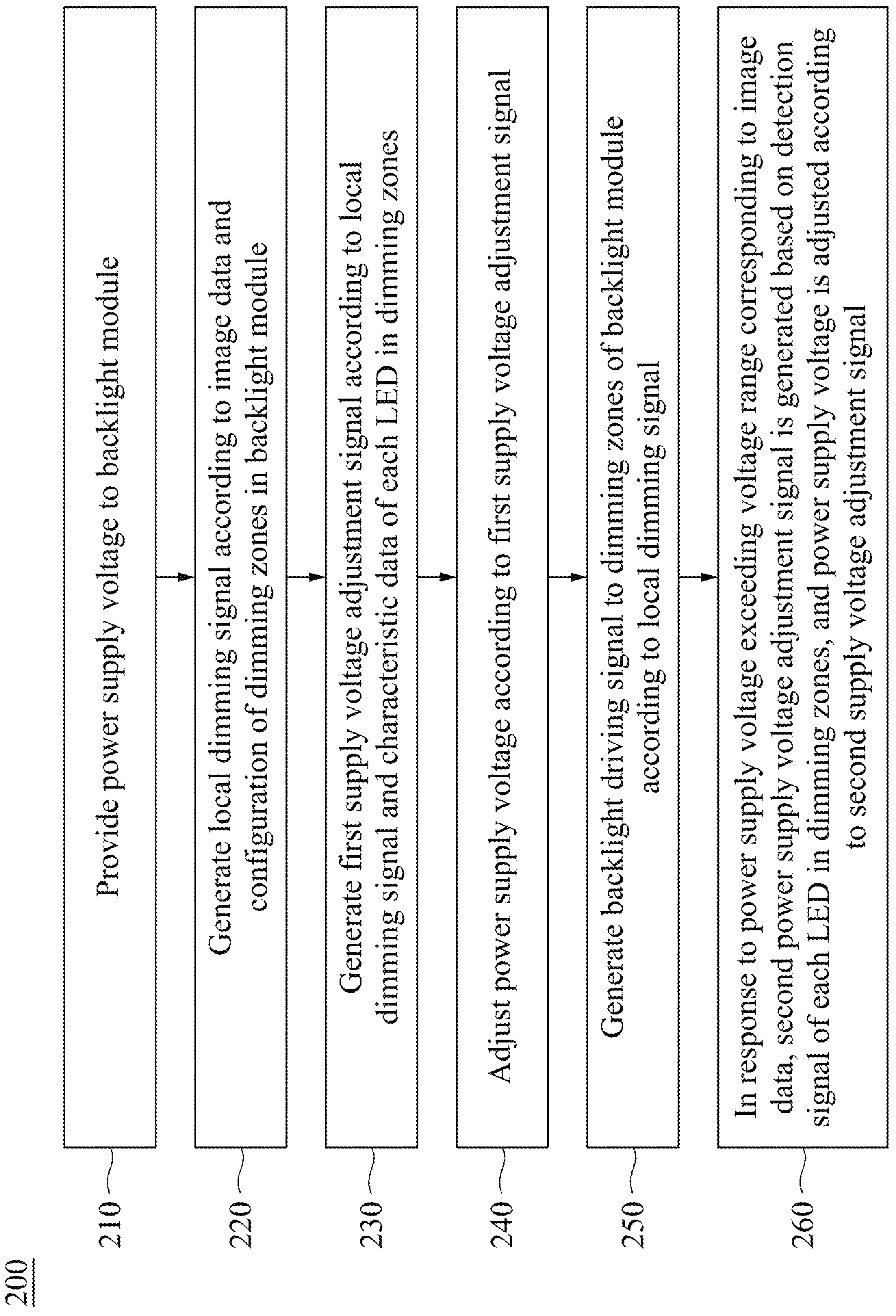
FIG. 6 is a flowchart diagram of a backlight control method according to an embodiment of the present disclosure.

Referring to FIG. 6, the backlight control method 200 according to an embodiment of the present disclosure includes Steps 210 to 250, and the backlight control method 200 may be implemented by means of the display device 100 and the backlight control circuit 120 shown in FIGS. 1 and 2, or by an architecture having similar functions. The backlight control method 200 and the backlight control circuit 120 of FIG. 2 are described below in conjunction with each other, and the operating principles of some steps are disclosed above, so they will not be repeated.

At Step 210, the power supply circuit 121 continuously provides power supply voltage $V_{LED}$ to the backlight module LD during each frame period to illuminate each LED in each dimming zone LDa.

At Step 220, the local dimming circuit 122 receives an image data of a frame image to be displayed in the next frame and calculates the local dimming signal $S_{LD}$ required by the image data corresponding to a configuration of the dimming zones LDa.

At Step 230, the supply voltage adjustment circuit 124 receives the local dimming signal $S_{LD}$ and generates a first supply voltage adjustment signal $V_1$ based on the local dimming signal $S_{LD}$ and a characteristics data of each LED in each dimming zone LDa.

At Step 240, the power supply circuit 121 adjusts the power supply voltage $V_{LED}$ to an appropriate value in advance based on the first supply voltage adjustment signal $V_1$. Consequently, the stabilization of the driving current for each dimming zone LDa may be accelerated, and the power loss may be effectively reduced.

At Step 250, the backlight driving circuit 123 generates a corresponding backlight driving signal SBD for each dimming zone LDa of the backlight module LD based on the local dimming signal $S_{LD}$ to control the current value flowing through the LEDs in each dimming zone LDa and to cause them to emit a corresponding brightness.

In some embodiments, the backlight control method 200 further includes Step 260. When the power supply voltage $V_{LED}$ is out of a voltage range corresponding to the image data, the supply voltage adjustment circuit 124 generates a second supply voltage adjustment signal $V_2$ based on a detected signal $V_D$ of each LED in the dimming zones LDa, and fine-tunes the power supply voltage $V_{LED}$ based on the second supply voltage adjustment signal $V_2$. When a level of the second supply voltage adjustment signal $V_2$ increases, the power supply circuit 121 decreases a level of the power supply voltage $V_{LED}$. Conversely, when the level of the second supply voltage adjustment signal $V_2$ decreases, the power supply circuit 121 increases the level of the power supply voltage $V_{LED}$. As a result, the power supply voltage $V_{LED}$ may be fine-tuned to a desired value by the second supply voltage adjustment signal $V_2$.

In some embodiments, the dimming zones LDa of the backlight module LD may be divided into a plurality of strip zones, and the luminance dimming of each strip zone is implemented as desired. In some embodiments, the backlight module LD may be divided into multiple columns and rows of array dimming zones, and the luminance dimming of the dimming zones of each column and row may be implemented as desired. It should be understood that any backlight module LD capable of implementing multi-zone dimming is within the scope of the present disclosure.

According to the display device, the backlight control circuit and the backlight control method of the present disclosure, based on the local dimming signal and the characteristic data of each LED in each dimming zone, the power supply voltage required for the backlight module of the next frame image is predicted, so that the starting control point of the power supply voltage of the power supply circuit is advanced, and the power supply voltage is adjusted to an appropriate value in advance. In conclusion, the present disclosure accelerates the speed of stabilizing the driving current required by each dimming zone and effectively reduces the power loss.

Although the present disclosure has been disclosed in embodiments as above, the embodiments are not intended to limit the present disclosure, and those skilled in the art may make some modifications and embellishments within the spirit and scope of the present disclosure, therefore, the scope of protection of the present disclosure shall be defined in the appended claims.

What is claimed is:

1. A backlight control circuit, comprising:

a power supply circuit configured to output a power supply voltage to a backlight module having a plurality of dimming zones, and each of the dimming zones comprises a plurality of light emitting diodes (LEDs);

a local dimming circuit configured to generate a local dimming signal based on an image data and a configuration of the dimming zones;

a backlight driving circuit configured to generate a plurality of backlight driving signals based on the local dimming signal; and a supply voltage adjustment circuit configured to generate a first supply voltage adjustment signal to the power supply circuit for adjusting the power supply voltage based on the local dimming signal and a characteristic data of each of the LEDs in the dimming zones.

2. The backlight control circuit according to claim 1, wherein the local dimming signal comprises a plurality of luminance values corresponding to the dimming zones in the image data, and the luminance values are provided to the backlight driving circuit to generate the backlight driving signals accordingly.

3. The backlight control circuit according to claim 1, wherein each of the backlight driving signals is a current driving signal, and the characteristic data comprises a relationship data between an operating voltage and an operating current of each of the LEDs in the dimming zones.

4. The backlight control circuit according to claim 1, wherein the supply voltage adjustment circuit is further configured to generate a second supply voltage adjustment signal to the power supply circuit to adjust the power supply voltage in response to the power supply voltage being out of a voltage range corresponding to the image data, and wherein the second supply voltage adjustment signal is generated based on a detection signal of each of the LEDs in the dimming zones.

5. The backlight control circuit according to claim 4, wherein the supply voltage adjustment circuit comprises:

an analog regulation circuit configured to decrease a level of the power supply voltage in response to a level of the second supply voltage adjustment signal increasing, and to increase the level of the power supply voltage in response to the level of the second supply voltage adjustment signal decreasing.

6. The backlight control circuit according to claim 4, wherein the detection signal is a cathode voltage of each of the LEDs.

7. The backlight control circuit according to claim 4, wherein the detection signal is generated by the backlight driving circuit detecting a cathode voltage of each of the LEDs.

8. A display device, comprising:

a display panel configured to display a frame image based on an image data;

a backlight module configured to provide a backlight source to the display panel, the backlight module having a plurality of dimming zones, and each of the dimming zones comprises a plurality of light emitting diodes (LEDs);

a power supply circuit configured to output a power supply voltage to the backlight module;

a local dimming circuit configured to generate a local dimming signal based on the image data and a configuration of the dimming zones;

a backlight driving circuit configured to generate a plurality of backlight driving signals to the dimming zones of the backlight module based on the local dimming signal; and a supply voltage adjustment circuit configured to generate a supply voltage adjustment signal to the power supply circuit for adjusting the power supply voltage based on the local dimming signal and a characteristic data of each of the LEDs in the dimming zones.

9. The display device according to claim 8, wherein the power supply circuit is configured to adjust the power supply voltage according to the supply voltage adjustment signal before the display panel displays the frame image.

10. The display device according to claim 8, wherein each of the backlight driving signals is a current driving signal, and the characteristic data comprises a relationship data between an operating voltage and an operating current of each of the LEDs in the dimming zones.

11. A backlight control method, comprising:

providing a power supply voltage to a backlight module;

generating a local dimming signal based on an image data and a configuration of a plurality of dimming zones in the backlight module, wherein each of the dimming zones comprises a plurality of light emitting diodes (LEDs);

generating a plurality of backlight driving signals to the dimming zones of the backlight module based on the local dimming signal;

generating a first supply voltage adjustment signal based on the local dimming signal and a characteristic data of each of the LEDs in the dimming zones; and adjusting the power supply voltage according to the first supply voltage adjustment signal.

12. The backlight control method according to claim 11, wherein the power supply voltage is adjusted according to the first supply voltage adjustment signal is performed before a frame image based on the image data is displayed on a display panel provided with a backlight source by the backlight module.

13. The backlight control method according to claim 11, wherein each of the backlight driving signals is a current driving signal, and the characteristic data comprises a relationship data between an operating voltage and an operating current of each of the LEDs in the dimming zones.

14. The backlight control method according to claim 11, further comprising:

generating a second supply voltage adjustment signal based on a detection signal of each of the LEDs in the dimming zones in response to the power supply voltage being out of a voltage range corresponding to the image data; and adjusting the power supply voltage based on the second supply voltage adjustment signal.

15. The backlight control method according to claim 14, wherein adjusting the power supply voltage based on the second supply voltage adjustment signal comprises:

decreasing a level of the power supply voltage in response to a level of the second supply voltage adjustment signal increasing, and increasing the level of the power supply voltage in response to the level of the second supply voltage adjustment signal decreasing.

16. The backlight control method according to claim 14, wherein the detection signal is a cathode voltage of each of the LEDs.

17. The backlight control method according to claim 14, further comprising:

detecting a cathode voltage of each of the LEDs to generate the detection signal.

* * * * *